United States Patent Office 2,719,830
Patented Oct. 4, 1955

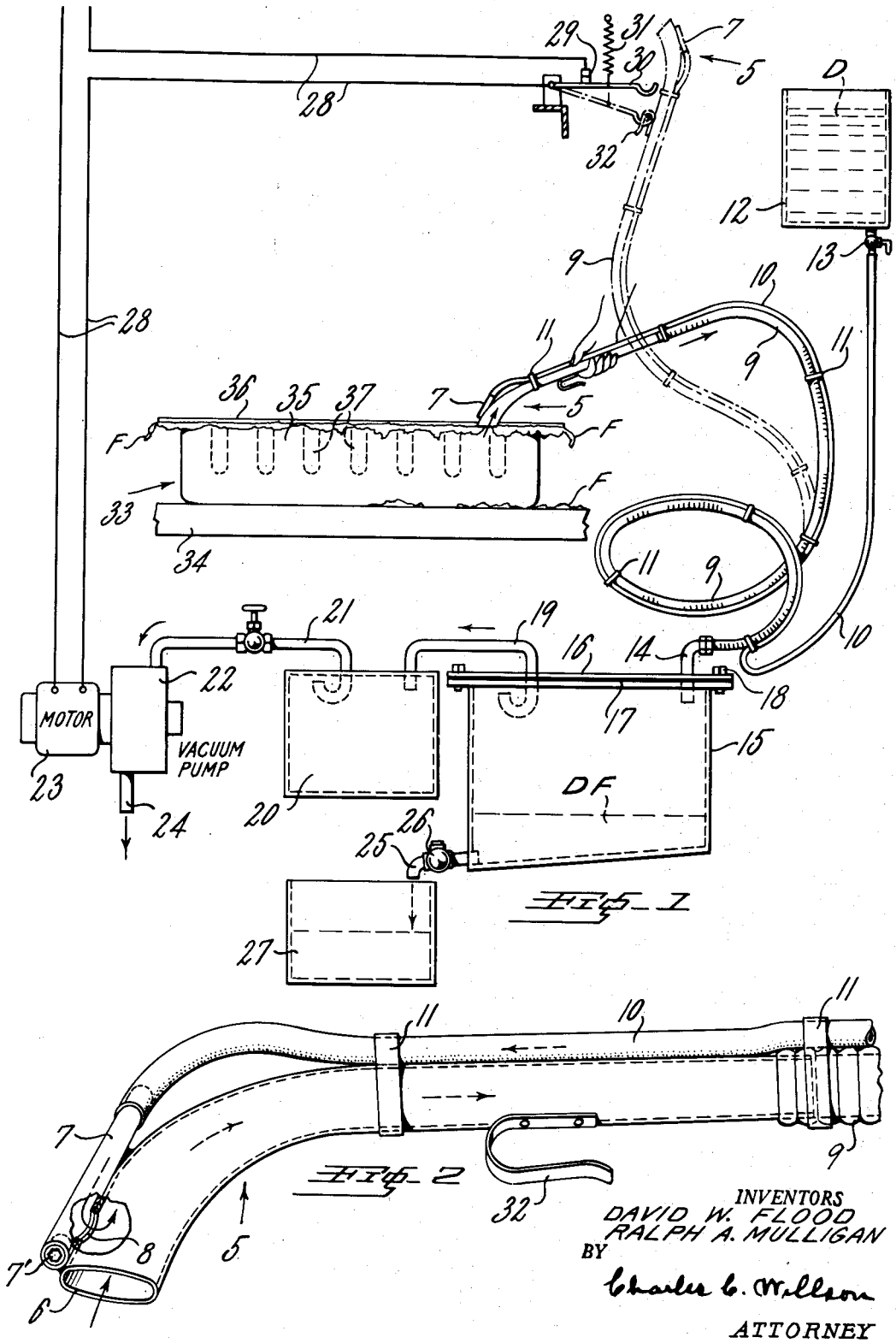

2,719,830

METHOD OF AND APPARATUS FOR RECLAIMING LATEX FOAM

David W. Flood, Blackstone, Mass., and Ralph A. Mulligan, Cranston, R. I., assignors to United States Rubber Company, New York, N. Y., a corporation of New Jersey Application January 8, 1953, Serial No. 330,344

11 Claims. (Cl. 260—2.3)

This invention relates to reclaiming latex foam and has reference more particularly to a method of and apparatus for gathering up and desensitizing quantities of sensitized foam, especially that which squeezes out at the parting line of molds in which foam rubber is shaped and vulcanized.

In manufacturing cushions and other articles from foam rubber, liquid latex containing the usual compounding and vulcanizing ingredients is frothed with a gas to produce a foam resembling whipped cream. Just prior to pouring the foam into the mold a gelling agent, such as alkali silicofluoride, is mixed into the foam, and the thus sensitized foam is poured into a mold, whereupon it gels irreversibly. To produce a full-shaped article having no voids, pits or pockets in the surface thereof, the mold is always loaded with an excess of foam. Depending upon the skill of the operator, this excess, or "flash" as it is sometimes called, may be small or it may be large, but in every instance upon closing the mold some excess foam is squeezed out at the parting line. Within a few minutes this foam gels irreversibly and cannot be reclaimed for use in latex foam compounds. The most serious objection to this procedure is the loss of the latex involved. In a modern foam rubber plant where hundreds of molds are filled every hour the loss involves a great deal of money. Further, the latex flash and spillage is very messy and must be cleaned from the molds, mold cradles and conveyors used to advance the molds, and on which it may fall.

It has been known heretofore that latex foam containing a sensitizer can be reclaimed if treated promptly and before gelling, with a desensitizing agent, such as a dilute solution of alkali hydroxide and alkali borate. The alkalies arrest gelation by buffering the solution and neutralizing the acid produced by hydrolysis of the silicofluoride gelling agent. This method for desensitizing sensitized latex foam is disclosed in detail in U. S. Patent 2,313,463 and has been employed in the art for years. The desensitizing solution described in such patent is satisfactory for the desensitizing use herein contemplated. Although the process of such patent is well known its use has been limited to reclaiming foam remaining on the beaters or in the mixing tubs or other vessels from which the latex foam could be washed with desensitizing solution. The process was never extended to the reclaiming of mold flash, so far as we know, because no practical way was known to collect the sensitized foam quickly and bring it into contact with a desensitizing solution before gelling.

This reclaiming of spilled latex foam is accomplished in accordance with the present invention by sucking up the sensitized foam through a nozzle on the end of a hose connected to a vacuum chamber, and simultaneously introducing a desensitizing solution into the nozzle near its intake end, whereby the foam and desensitizing solution are thoroughly intermixed to arrest gelation of the foam as the mixture passes through the nozzle and hose to the vacuum chamber. The desensitized foam is then drained from the vacuum chamber, creamed if necessary, fed back into the fresh latex in limited quantities, refrothed and processed into foam rubber articles in the conventional manner. The nozzle connected to the intake end of the vacuum hose is especially constructed so that the desensitizing solution can be introduced near the intake end thereof through a branch tube. As the air rushes into the hose through the nozzle the desensitizing solution supplied by the tube is carried against the inside surface of the hose and is advanced with a swirling motion through the nozzle and hose. When the suction nozzle is brought near latex foam by an operator the foam rushes into the nozzle and immediately comes into intimate contact with the desensitizing solution. Thus, the desensitizing action begins at once and continues as the foam and desensitizing solution pass to the vacuum chamber. This prevents the latex foam from depositing on the inner walls of the hose and clogging the hose.

The principal objects of the invention are to provide an improved method and novel apparatus for gathering up sensitized latex foam from molds and other processing apparatus to reclaim it, and for immediate desensitizing this foam to prevent its gelation; to provide apparatus that will operate for long periods of time either continuously or intermittently without clogging up; to provide means for producing desensitized foam of such quality that will permit its use back into fresh latex compound.

These and other objects not specifically enumerated are contemplated by this invention as will be apparent to one skilled in the art as the following description proceeds.

In the drawing—

Fig. 1 is a schematic view of the complete foam reclaiming apparatus shown in use adjacent a latex foam mold; and Fig. 2 is a perspective view of a preferred suction nozzle constructed for use in carrying out the invention.

The nozzle shown in Fig. 2 constitutes an important part of the present invention and therefore will be described first. This nozzle which is designated in its entirety by the numeral 5 is formed of plastic or metal that will not be attacked by the desensitizing solution, and is curved near its outer end to facilitate the use of this nozzle to suck up the latex foam to be reclaimed. The intake end 6 of this nozzle is preferably elliptical shaped as shown to facilitate its suction action. To the curved portion of the nozzle 5 is secured a small liquid supply tube 7 that communicates with the interior of the nozzle through a hole 8 formed in the side wall of the tube and nozzle. The end of this tube is closed by the plug 7'. The suction nozzle 5 is attached to a relatively large non-collapsing hose 9 of substantial length and which is internally reinforced by a coiled wire in a well known manner. A desensitizing solution is supplied to the tube 7 by a small flexible tube 10 which is conveniently formed of a plastic that will not be attacked by the desensitizing solution and the tube 7 is preferably formed of stainless steel. The tube 10 is secured to the nozzle 5 and vacuum tube 9 by the tie bands 11. These bands secure the tube 10 to the suction hose 9 throughout the major portion of the length of the hose as shown in Fig. 1, to facilitate the handling of the combined hose and tube by the person operating the suction nozzle 5.

A complete apparatus for successfully practicing the invention is illustrated in Fig. 1. An elevated tank 12 contains the desensitizing solution D. This solution is supplied to the tube 10 at a rate of flow determined by adjusting the hand valve 13. The tank 12 is supported at an elevation above the operating position of the nozzle 5 so that the desensitizing solution, such as alkali hydroxide, will flow by gravity to the tube 7. The other end of the flexible suction hose 9 is connected to a pipe 14 that extends into a vacuum receptacle 15 through the tank cover 16 that rests upon a gasket 17 and the cover is tightly secured to the top of the tank by the bolts 18. The latex foam picked up by the suction nozzle 5 is discharged into the receptacle 15 by the vacuum hose 9 to accumulate in the lower portion of this tank as indicated by DF. Since the latex foam picked up by the nozzle 5 contains a gelling agent it will gel or set quickly, unless prevented from doing so, to solidify in the nozzle 5 and hose 9 and clog them within a few minutes. This clogging of the parts just mentioned by the sensitized foam is prevented by supplying near the intake end of the nozzle 5 the desensitizing solution D, such as described in the above mentioned patent, and which reaches this tube 7 through the supply tube 10 and passes into a nozzle through the opening 8. This solution is drawn into the nozzle by the air that is sucked in through the end 6 of the nozzle. The desensitizing solution carried by the air whirling within the suction nozzle and hose will be deposited on the inner walls of the nozzle and on the non-collapsing hose 9 to a sufficient degree to moisten these walls and prevent the latex foam from adhering thereto, and the desensitizing solution becomes sufficiently intermixed with the latex foam picked up by the nozzle to retard gelation of this foam. This, as above stated, prevents clogging of the nozzle 5 and hose 9 and causes this picked up foam to be deposited in the lower portion of the receptacle 15. A relatively small amount of the desensitizing solution D is sufficient to retard gelation of the latex foam, and prevent this foam from clogging the nozzle and hose. When this nozzle is brought near the light fluffy, foam it is drawn into the nozzle and into immediate contact with the desensitizing solution so that they travel together through the hose 9 to the receptacle 15.

Obviously the nozzle 5 may be made in any convenient shape or size according to need. In fact, the nozzle as such may be omitted entirely if the tube 10 is adapted to connect directly to hose 9. It is important, however, that the branch line 10 carrying the desensitizing solution be connected near the end of the nozzle or hose. If the foam passes any distance through the nozzle or hose before mixing with the desensitizing solution, this end ultimately clogs up with gelled latex foam.

The suction receptacle 15 is evacuated through a line 19 connected to a vacuum pump 22 through line 21, and the pump has the discharge pipe 24. A trap 20 is preferably placed between the receptacle 15 and the vacuum pump to catch any accidental overflow of latex from the receptacle which might be drawn into line 19 and would foul up the pump 22. The trap 20 consists of a closed vessel, such as a small drum having an inlet and outlet similar to that used for the receptacle 15. An electric motor 23 powers the vacuum pump which is of a standard commercial construction. The vacuum receptacle 15 is provided with a drain pipe 25 equipped with a check or flapper valve 26 which will permit flow out of the receptacle only, in the discharge direction as indicated by the arrow. When the receptacle 15 is evacuated, atmospheric pressure through the open end of pipe 25 keeps the check valve 26 closed. A suitable container 27 is provided beneath the pipe 25 to receive desensitized foam DF that drains from the receptacle 15. It has been found convenient to break the vacuum when the apparatus is not in use by opening the circuit to the motor 23 which drives the vacuum pump 22. This is accomplished by providing the wires 28 and electric switch 29 which is under the control of an elevated pivoted lever 30 that is urged to the switch closed position by a spring 31. When the operator hangs the nozzle on the lever 30 by engaging the nozzle hook 32 therewith, the nozzle's weight will depress the lever 30 to open the circuit and stop the motor 23. When the nozzle is in use the switch 29 is closed by reason of the spring action, that moves the lever 30 to its elevated position.

It will be noted from the drawing that the end of line 19 which extends into the receptacle 15 and the end of line 21 which extends into the trap 20 are curved upwardly in the shape of a hook so that the open end is close to the top of the receptacle. Furthermore, these hooked ends are relatively far removed from the other lines which serve as entrance conduits to these receptacles. This construction aids in preventing desensitized foam from being carried through the air and into the vacuum line instead of falling to the bottom of the receptacle. This would be more likely to occur in receptacle 15 into which the desensitized foam DF is delivered by the hose 9. Should some of the desensitized material accidentally be carried into the line 19 due to the filling of the receptacle 15 or for some other reason, the trap 20 would serve to catch this material and prevent it from fouling up the vacuum pump 22. The possibility of desensitized material escaping through line 19 is made extremely remote because of the construction of the lead lines to and from the receptacle 15.

The operation of the apparatus will be illustrated by describing the reclaiming of latex foam F overflowing from a typical mold 33 that rests on a support on conveyor 34. The mold comprises a pan 35 and a top plate 36 having coring elements 37 projecting downwardly therefrom. The foam F, sensitized with alkali silicofluoride gelling agent, is poured into the pan 35. The top plate is lowered into position and as the mold closes the displacement of foam by the cores 37 causes the level of the foam to rise and squeeze out from between the edge of the pan and the top plate to form the foam waste F. When nozzle 5 is on the pivoted lever 30 the power to the motor 23 is off and consequently there is no vacuum in receptacle 15. Also the lever 30 is above the level of the desensitizing solution D in the reservoir 12 so that there is no flow at this time therefrom into the nozzle 5 through the tube 10. Upon removing the nozzle from the lever 30 and lowering it into operating position at the level of the mold 34, the switch 29 closes to start the vacuum pump, and solution D begins to flow by gravity into the nozzle as previously described. Although the gravity feed has been found to be a convenient means for admitting solution D to the nozzle it will be understood that other means can be used, for example, the solution may be fed by a metering pump which might be powered by a motor connected through switch 29 so that the metering pump would begin to operate simultaneously with the vacuum pump.

When the vacuum pump is operating the nozzle 5 is moved by hand along the parting line of the mold just like an attachment on the household vacuum cleaner. The foam F is sucked up cleanly leaving practically no residue on the external surface of the mold or adjacent parts. The mixture of the foam F and the desensitizing solution D passes through the hose 9 and line 14 into the evacuated receptacle 15. So long as the nozzle is being used to pick up foam the receptacle 15 remains evacuated and the check valve 26 remains closed. After the operator cleans up one or more molds the nozzle 5 is again hung on the supporting lever 30, this will immediately open the switch 29 to cut the power to the motor 23, which stops the vacuum pump. Air coming in through the nozzle 5 quickly fills the receptacle 15 to equalize the pressure inside to that of the atmosphere. The head of material DF which has accumulated in the receptacle 15 then opens the check valve 26 and the desensitized material drains through pipe 25 into the open receptacle 27. Raising the nozzle 5 above the level of solution in the reservoir 12 stops the flow of solution into the hose 9. This is highly desirable because additional solution running into the receptacle 15 dilutes the latex foam unduly. Before the desensitized latex can be fed back into fresh latex compound in practical amounts it should preferably contain from 45 to 55% of solids. By properly regulating the flow of solution the foam can be completely desensitized without undue dilution. This permits the desensitized latex to be reused directly without creaming which normally must be done to increase the solids. Of course, if for some reason, the dilution is too great the desensitized material can be creamed in receptacle 27.

While the preferred embodiment of this invention has been described in considerable detail and works very satisfactorily to reclaim latex foam, many changes and modifications may be made without departing from the principles of the invention, the scope of which is to be determined by the appended claims.

Having thus described our invention, what we claim and desire to protect by Letters Patent is:

1. The method of gathering up and reclaiming sensitized latex foam, which comprises sucking the foam through a hose that is connected to a vacuum chamber, simultaneously introducing into the intake end portion of the hose a desensitizing solution so that the foam and desensitizing solution become intermixed in the hose to arrest gelation of the foam therein, and depositing the foam in the vacuum chamber.

2. The method of gathering up and reclaiming excess sensitized latex foam, which comprises sucking the foam through a hose that is connected to a vacuum chamber, simultaneously introducing into the intake end portion of the hose through a side wall thereof a desensitizing solution so that the foam and desensitizing solution become intermixed in the hose to arrest gelation of the foam therein, and depositing the foam in the vacuum chamber.

3. The method of gathering up and reclaiming excess sensitized latex foam, which comprises sucking the foam through a hose that is connected to a vacuum chamber, simultaneously sucking into the hose near its intake end a desensitizing solution so that the foam and desensitizing solution become intermixed in the hose to arrest gelation of the foam therein, and discharging this foam into the vacuum chamber.

4. The method of gathering up and reclaiming excess sensitized latex foam, which comprises sucking the foam through a hose that is connected to a vacuum chamber, simultaneously introducing into the intake end portion of the hose a desensitizing solution so that the foam and desensitizing solution become intermixed in the hose to arrest gelation of the foam therein, and discharging this foam into the top portion of the vacuum chamber to settle to the bottom thereof.

5. Apparatus for gathering up and reclaiming sensitized latex foam, comprising a vacuum receptacle, a suction hose connected thereto and having its intake end shaped to suck up sensitized foam, means for introducing a desensitizing solution into the intake end portion of the hose so that this solution becomes intermixed in the hose with the foam to arrest gelation of the foam therein, and means for exhausting air from said receptacle so as to draw the foam through the hose into this receptacle.

6. Apparatus for gathering up and reclaiming excess sensitized latex foam, comprising a relatively deep vacuum receptacle, a flexible hose having a suction nozzle at one end and the other end connected to the receptacle so as to suck up the sensitized latex and discharge it into the upper portion of the receptacle to settle to the bottom thereof, and means for introducing a desensitizing solution into the hose near its intake end so that it will arrest gelation of the foam passing through the hose.

7. Apparatus for gathering up and reclaiming excess sensitized latex foam, comprising a vacuum receptacle, a suction hose connected thereto and having its intake end shaped to suck up sensitized foam, means for introducing a desensitizing solution into the intake end portion of the hose so that this solution becomes intermixed in the hose with the foam, means for exhausting air from the receptacle so as to draw the foam through the hose into the receptacle to deposit at the bottom thereof, and a discharge valve leading from the bottom of the receptacle to discharge the foam therefrom and which is normally open but is held closed by the suction within the receptacle.

8. The method of gathering up and reclaiming sensitized latex foam, which comprises sucking up the sensitized foam, simultaneously applying a desensitizing material to the foam, and conveying the foam and desensitizing material by vacuum to a chamber where the foam may be reclaimed.

9. The method of gathering up and reclaiming excess sensitized latex foam from a gelling chamber, which comprises sucking the excess foam from the edge of the chamber through a hose that is connected to a vacuum chamber, simultaneously introducing into the intake end portion of the hose through a sidewall thereof a desensitizing solution so that the foam and desensitizing solution become intermixed in the hose to arrest gelation of the foam therein, and depositing the foam in the vacuum chamber.

10. The method of gathering up and reclaiming sensitized latex foam, which comprises sucking up the sensitized foam, simultaneously applying a desensitizing solution to the foam, conveying the foam and desensitizing solution by vacuum to a chamber where the foam may be reclaimed, and swirling the desensitizing solution about the foam as it is moved by the vacuum to prevent gelation of the foam while it is being conveyed.

11. Apparatus for gathering up and reclaiming excess sensitized latex foam from a mold, which comprises a vacuum receptacle, a suction hose connected thereto and having its intake end shaped to suck up sensitized foam, said hose having an opening therethrough adjacent its intake end for introducing a desensitizing solution into the intake end portion of the hose, a source of desensitizing solution connected to the hose through said opening therein, means for exhausting air from the vacuum receptacle so as to draw the foam into and through the hose and the sensitizing solution into the hose through said opening and through the hose simultaneously into the receptacle to deposit at the bottom thereof.

References Cited in the file of this patent

UNITED STATES PATENTS

| | | |
|---|---|---|
| 1,420,543 | Hahn | June 20, 1922 |
| 1,792,590 | Kirk | Feb. 17, 1931 |
| 2,457,684 | Klemp | Dec. 28, 1948 |
| 2,568,499 | Hood | Sept. 18, 1951 |
| 2,568,803 | Guenst | Sept. 25, 1951 |

OTHER REFERENCES

Chemical Engineers' Handbook, Perry 3d edition, 1950, pages 1360 and 1203.